(12) United States Patent  
Murray (10) Patent No.: US 6,308,603 B1
(45) Date of Patent: Oct. 30, 2001

(54) METHOD AND APPARATUS FOR BUCKSAWING LOGS

(76) Inventor: Robert J. Murray, Apartment 336 - 7651 Minoru Boulevard, Richmond, B.C. (CA), V6Y 1Z3

( * ) Notice: Subject to any disclaimer, the term of this patent is extended or adjusted under 35 U.S.C. 154(b) by 0 days.

(21) Appl. No.: 09/616,676

(22) Filed: Jul. 14, 2000

Related U.S. Application Data (60) Continuation of application No. 08/932,389, filed on Sep. 17, 1997, now Pat. No. 6,089,135, which is a division of application No. 08/309,435, filed on Sep. 20, 1994, now Pat. No. 5,680,802.

(30) Foreign Application Priority Data

Aug. 29, 1994 (CA) .................................................. 2131056

(51) Int. Cl.[7] ..................................................... B26D 5/20
(52) U.S. Cl. ................. 83/209; 83/210; 83/280; 83/364; 83/365
(58) Field of Search ............................. 83/209, 210, 280, 83/364, 365, 231, 279, 363, 367, 369, 370, 155

(56) References Cited

U.S. PATENT DOCUMENTS

| | | | |
|---|---|---|---|
| 3,848,646 | 11/1974 | Miles | 83/365 |
| 4,085,638 | 4/1978 | Fifer | 83/365 |
| 4,175,458 | 11/1979 | Paris, Jr. et al. | 83/210 |
| 4,210,184 | 7/1980 | McGriff | 144/312 |
| 4,250,935 | 2/1981 | Helgesson et al. | 83/364 |
| 4,269,242 | 5/1981 | Smith et al. | 83/370 |
| 4,468,993 | 9/1984 | McCowan et al. | 83/363 |
| 4,534,002 | 8/1985 | Urban | 83/364 |
| 4,546,440 | 10/1985 | Palmberg | 83/364 |
| 4,637,443 | 1/1987 | Jansson | 83/367 |
| 4,887,219 | 12/1989 | Strausser | 83/365 |
| 5,060,547 | 10/1991 | Moriya et al. | 83/210 |

FOREIGN PATENT DOCUMENTS

| | | | |
|---|---|---|---|
| 2124144 | * 2/1984 | (GB) | 83/364 |
| 295711-A | 11/1989 | (JP) | 83/365 |
| 685904 | 9/1979 | (SU) | 83/364 |
| 823123 | 4/1981 | (SU) | 83/364 |
| 833122 | 4/1981 | (SU) | 83/364 |
| 893520 | 12/1981 | (SU) | 83/364 |
| 912493 | 3/1982 | (SU) | 83/370 |
| 1298077 | 3/1987 | (SU) | 83/155 |
| 1669716 | * 8/1991 | (SU) | 83/365 |

* cited by examiner

*Primary Examiner*—M. Rachuba
(74) *Attorney, Agent, or Firm*—Oyen Wiggs Green & Mutalad (57) ABSTRACT

Previous methods of bucksawing logs slow the throughput of a sawmill in that the conveyor line is stopped while a given log is bucksawed to length. The present invention provides a method for bucksawing a log which improves the throughput speed, comprising the steps of a) advancing the log endwise along an infeed conveyor; b) raising the log above the level of said infeed conveyor while advancing the log; c) measuring the advance of the log while raised; d) stopping the log at the desired length; e) sawing the log to produce a forward log segment; and f) lowering the forward log segment onto an outfeed conveyor while advancing the remaining log segments. An apparatus for carrying out the method is also disclosed.

12 Claims, 10 Drawing Sheets

METHOD AND APPARATUS FOR BUCKSAWING LOGS

CROSS REFERENCE TO RELATED APPLICATIONS

This application is a continuation of application Ser. No. 08/932,389 filed Sep. 17, 1997, now U.S. Pat. No. 6,089,135, which is a division of application Ser. No. 08/309,435 filed Sep. 20, 1994, now U.S. Pat. No. 5,680,802.

TECHNICAL FIELD

The invention relates to apparatus for cross-cutting or "bucksawing" long logs to produce logs of shorter length. More particularly the invention relates to a method and apparatus for feeding, positioning and holding a log for bucksawing to the desired length.

BACKGROUND ART

It is important in the sawing of logs into lumber that the selection of saw cuts be made to maximize the quantity and quality of lumber which is yielded by the log, depending on the length, thickness and quality of the log, such as the presence of knots, defects and the like. As the first step in this process, the tree-length log is cut into shorter lengths, or "bucked", prior to further processing. There are two commonly used methods of carrying this out in a sawmill. A first method is a transverse system whereby the tree-length log is moved sideways through a battery of buck saws where it is segmented simultaneously into shorter logs. This method is not particularly well suited to modifying the position of the cross cut to maximize the value and recovery from the log. A second method is the lineal bucking system whereby the tree-length log is moved endwise down the conveyor to a saw which bucks the log into shorter lengths one cut at a time. This method is better at maximizing the value and recovery from the log, but in both this method and the transverse method the speed of the transport conveyor is necessarily fixed at the speed the log moves through the sawing station, resulting in low throughput. For example, since the feed conveyor in the lineal bucking system must be stopped while the log is being bucked, there is no opportunity for closing the gaps between the logs on the feed conveyor.

There is therefore a need for a log bucksawing system in which the speed of the infeed and outfeed conveyors can be operated independently of the progress of the log at the sawing station.

DISCLOSURE OF INVENTION

The present invention provides a method for bucksawing a log comprising the steps of a) advancing the log endwise along an infeed conveyor; b) raising the log above the level of said infeed conveyor while advancing the log; c) measuring the advance of the log while raised; d) stopping the log at the desired length; e) sawing the log to produce a forward log segment; and f) lowering the forward log segment onto an outfeed conveyor while advancing the remaining log segments.

BRIEF DESCRIPTION OF DRAWINGS

In drawings which disclose a preferred embodiment of the invention.

BEST MODE(S) FOR CARRYING OUT THE INVENTION

Figure 1:
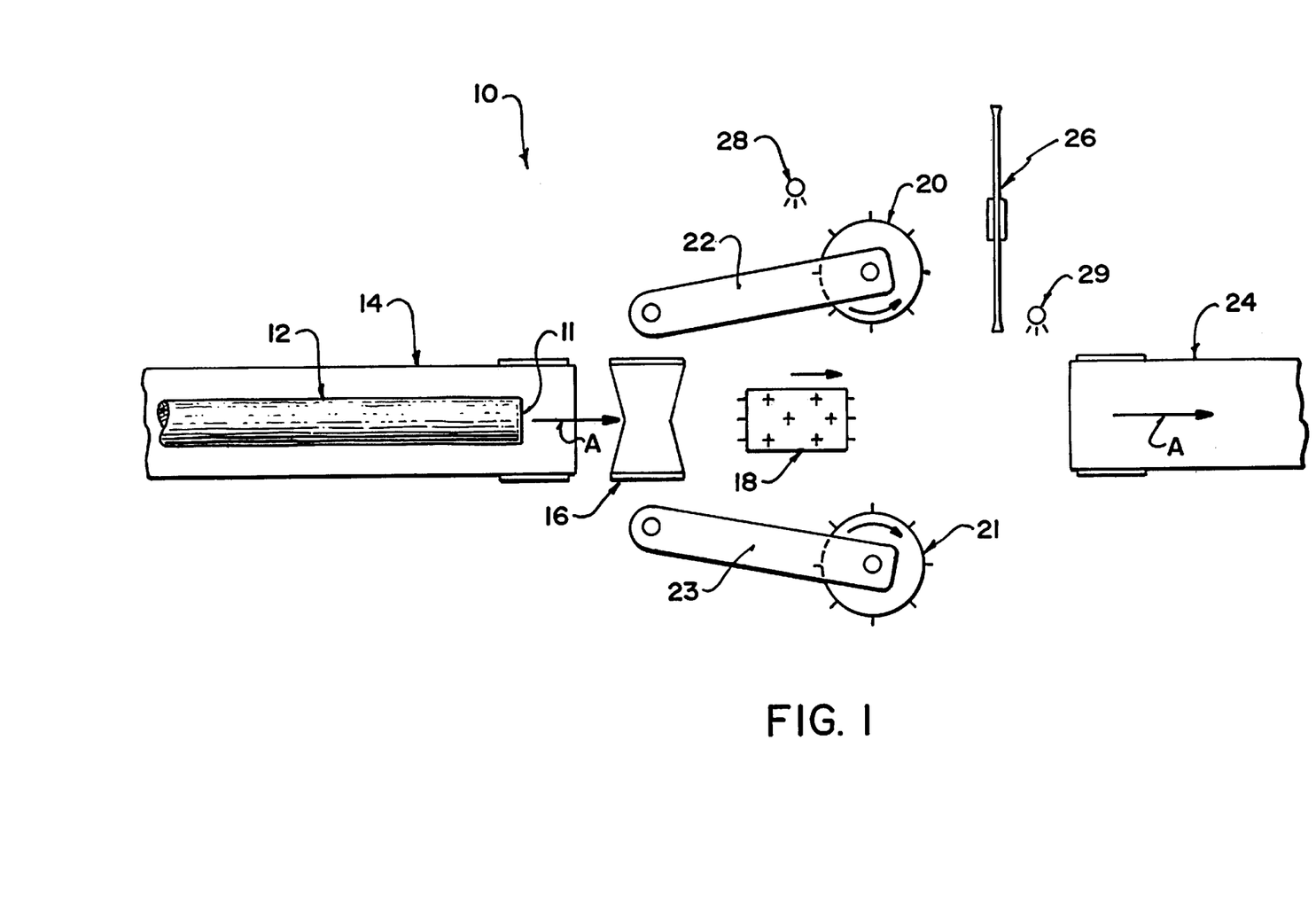
FIG. 1 is a schematic diagram showing the apparatus of the invention in top view with the log on the infeed conveyor.

Looking at FIG. 1, the bucksawing apparatus, designated generally as 10, has a log 12 moving in the direction of arrow A on infeed conveyor 14 towards a powered hourglass roll 16, horizontal bottom feed roll 18 and vertical side feed rolls 20, 21. Feed rolls 18, 20 and 21 are provided with spikes 25 (see FIGS. 6 and 7) to grip the log 12 without slippage, and are rotatably driven by hydraulic motors 70 (see FIGS. 6, 7) such as REXROTH™ fixed displacement motors Model AA2FM (series 61), 40 degree bent axis design, and a Transmital Bonfiglioli planetary gearbox (two-stage) Model 303L230MZ-WOA-S5BA-2T, 30:1. Preferably feed rolls 18, 20 and 21 are all formed of extra strong steel pipe approximately 2 (two) feet in diameter. The bottom feed roll 18 is preferably 1 (one) foot 10 inches in length, while the vertical rolls are preferably 2 (two) feet long. Pointed spikes 25 are preferably ¾-inch in diameter and are welded on the pipe at 15 degree intervals.

Vertical side feed rolls 20, 21 are pivotally mounted on the ends of arms 22, 23 which are supported on frame 44 and pivoted by cylinders 40, 42. The outfeed conveyor is indicated at 24 and the cut-off saw is provided at 26 on a pivoting arm 27 (FIG. 7) or some other conventional means for swinging the cut-off saw 26 perpendicularly across the path of the log 12. Saw 26 has a saw guard 30, and is driven by electric motor 32 through drive belt 35 and sheave 36 on shaft 38. Saw 26 is held on shaft 38 by collar 39. A belt guard 34 is provided. Arm 27 is pivoted by a position-sensing hydraulic cylinder 41 such as an REXROTH PRESSURE MASTER™ MT4-HH complete with TEMPOSONIC II™ probe TTS-RB-U-0240. Horizontal feed roll 18 is pivotally mounted on frame 45.

Photocells 28, 29 detect the passage of the forward and rear ends of the log 12. Photocells 28, 29 provide a signal to a computer, central processing unit or programmable logic controller (not shown) which controls the operation of the horizontal and vertical feed rolls 18, 20, 21 and cut-off saw pivot arm 27.

Figure 2:
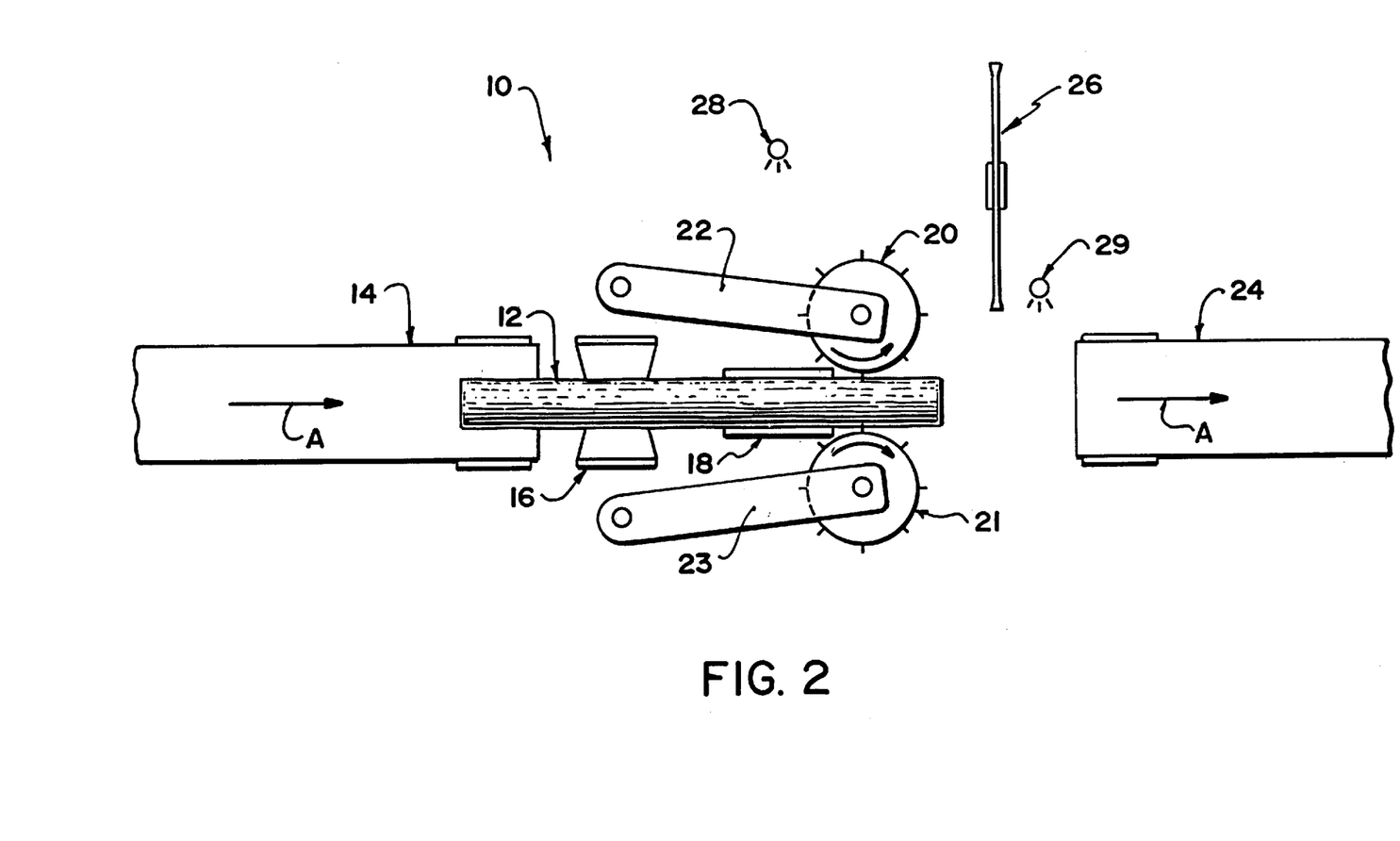
FIG. 2 is a schematic diagram showing the apparatus of the invention in top view with the log being positioned in the sawing station.
Figure 3:
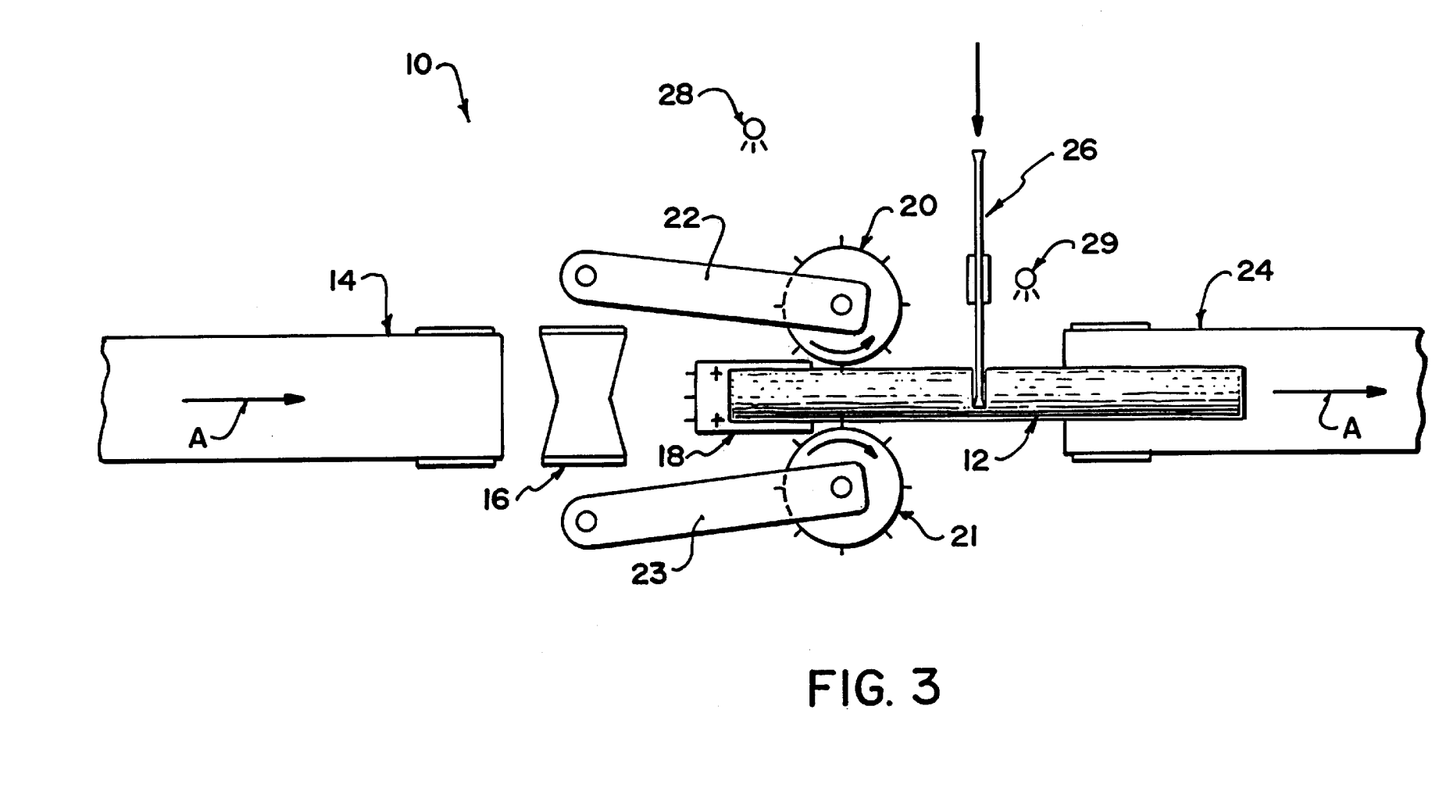
FIG. 3 is a schematic diagram showing the apparatus of the invention in top view with the log being sawn in the sawing station.
Figure 6:
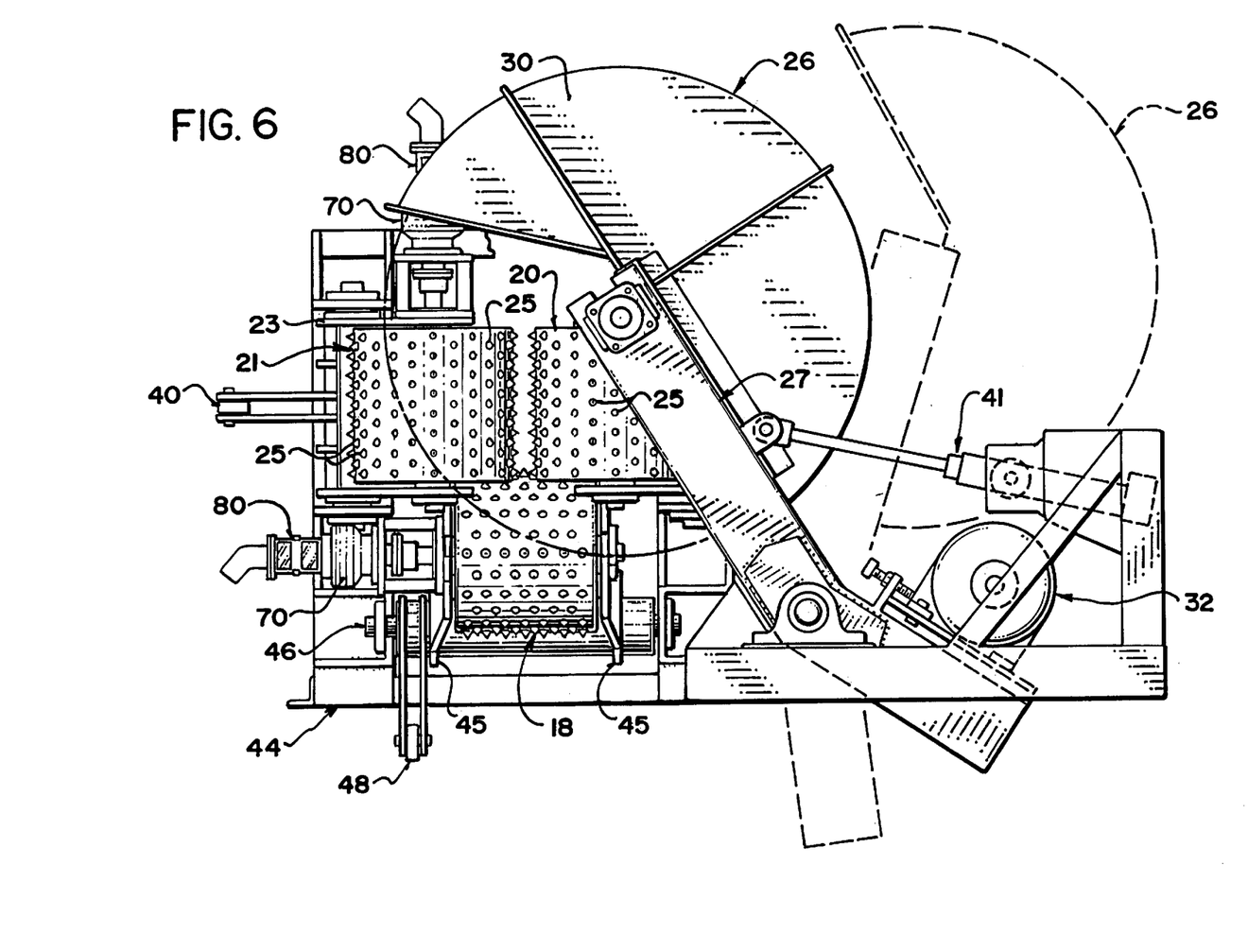
FIG. 6 is an end view, partially cut-away and partially in section, of the cut-off saw and feed rolls of the invention, with the rest position of the cut-off saw shown in phantom outline, and the saw blade removed for purposes of illustration.
Figure 7:
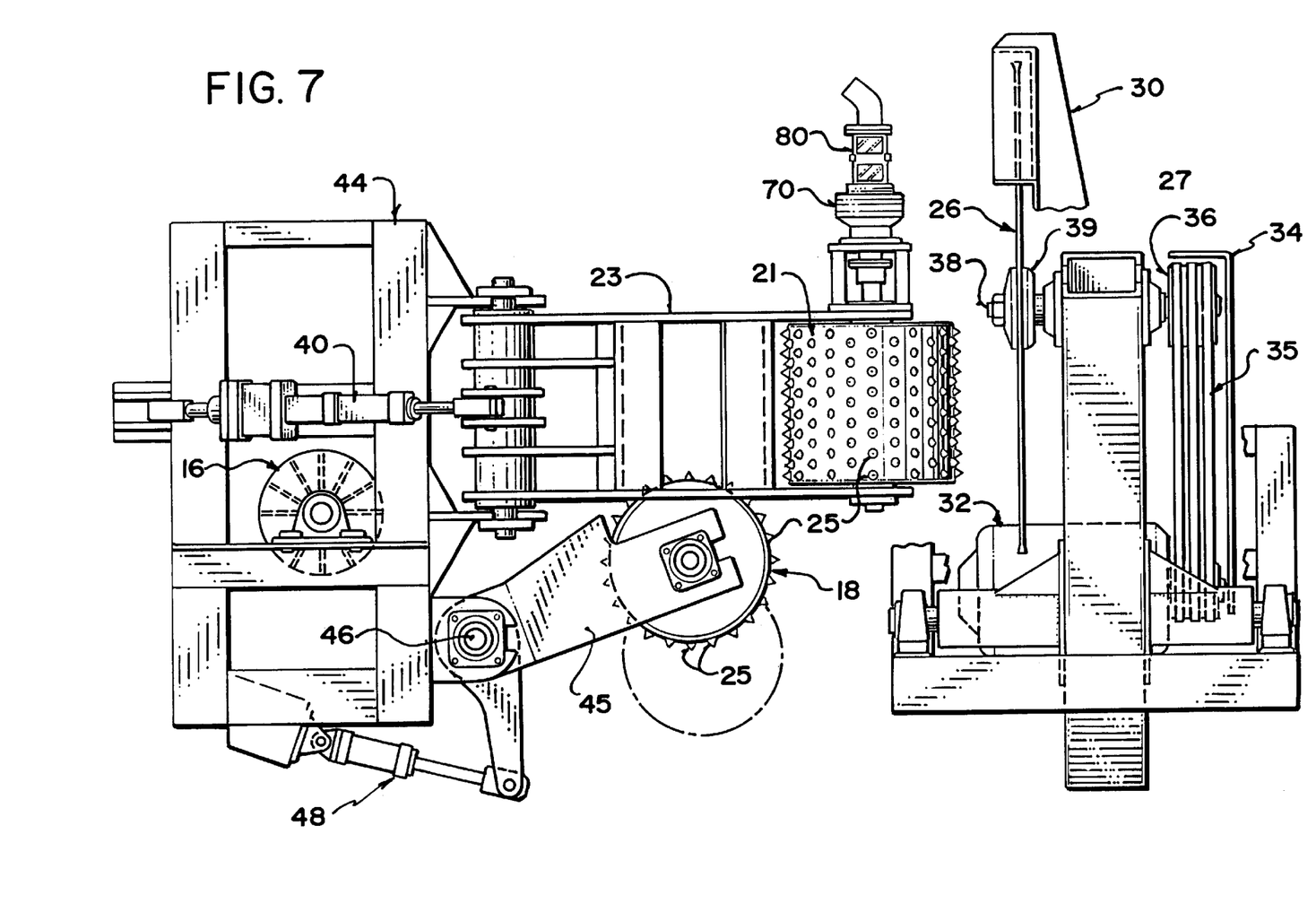
FIG. 7 is an elevation of the cut-off saw and feed rolls of the invention, with the lowered position of the bottom roll shown in phantom outline.
Figure 8:
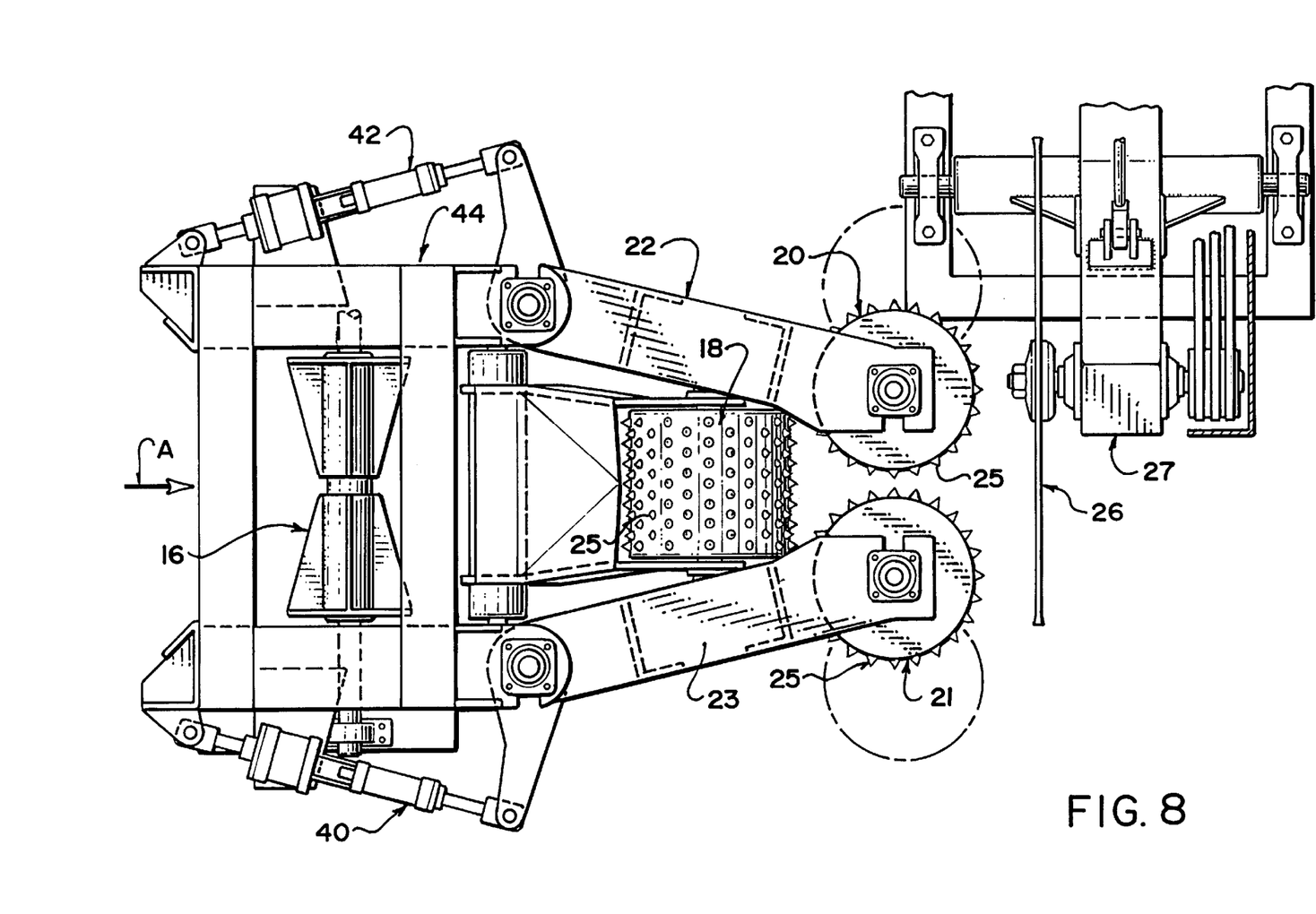
FIG. 8 is a plan view of the feed rolls of the invention, showing a portion of the cut-off saw.
Figure 9:
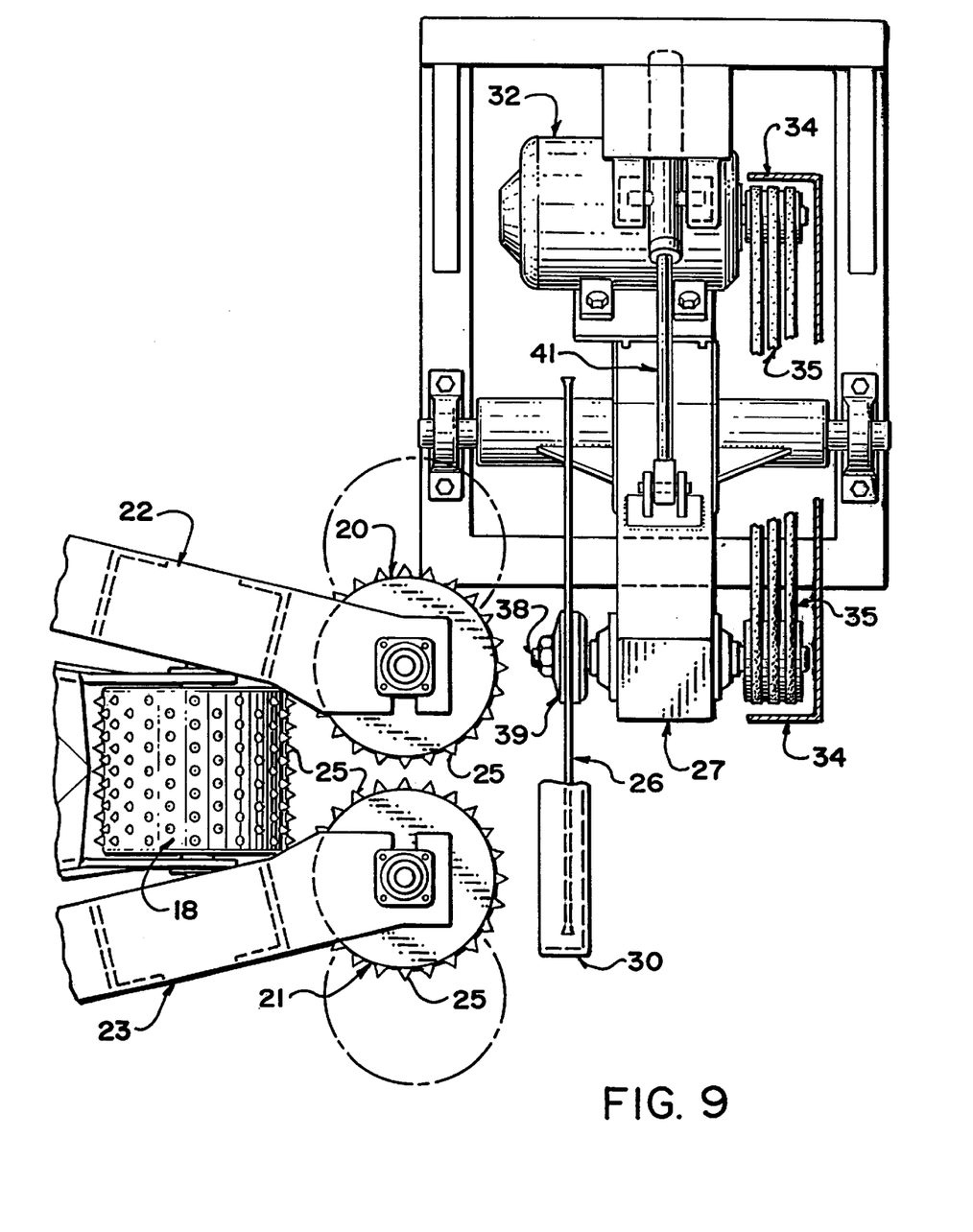
FIG. 9 is a plan view of the cut-off saw of the invention, showing a portion of the feed rolls.

The infeed and outfeed conveyors 14 and 24, which may be belts or chains, are normally run at a fixed, constant speed, although a variable speed may be used. When the feed system is not feeding or bucking a log, the vertical and horizontal rolls 18, 20, 21 can be run at the same speed as the infeed or outfeed conveyors. The log 12 will have been scanned prior to arrival at the infeed conveyor 14 and this scanning information is used to determine the location of the cuts made by cut-off saw 26. As the infeed conveyor 14 conveys log 12 towards the cut-off saw 26, the vertical feed rolls 20, 21 are in the open position shown in FIG. 1, swung away from the bottom feed roll 18. As shown in FIG. 2, as the log 12 is conveyed towards cut-off saw 26, it is centred along the axis of the feed line by hourglass roll 16. The surface of hourglass roll 16 and horizontal bottom roll 18 are about ½ inch to 1 (one) inch higher than the surface of the infeed conveyor, and as the forward end 11 of log 12 makes contact with hourglass roll 16 and bottom feed roll 18, it is lifted slightly above the level of infeed conveyor 14. When the forward end 11 of log 12 trips the photocells 28 located above and between hourglass roll 16 and the bottom feed roll 18, vertical feed rolls 20, 21 are pivoted inwardly and pre-positioned on arms 22, 23 to the approximate diameter of the log 12. As the forward end 11 of log 12 progresses to a position between the vertical feed rolls 20, 21, full hydraulic pressure is applied to hydraulic cylinders 40, 42 so that the vertical rolls 20, 21 are pivoted inwardly on arms 22, 23 to make full contact with the surface of log 12. As the forward end 11 of log 12 progresses and trips the second group of photocells 29 located just past the cut-off saw 26, the controller will activate the encoders 80 mounted on the hydraulic motor 70 output shafts driving the vertical feed rolls 20, 21, and activates the pivoting arm 27 on which cut-off saw 26 is mounted to index the cut-off saw in position directly behind feed roll 20. The length of the log which has passed the plane of the cut-off saw 26 is determined by the controller based on the number of encoder pulses received from the hydraulic motors 70, and once the desired length of the log has been reached based on the scanned information, the rolls 18, 20, 21 are stopped automatically and the log is bucked by pivoting the cut-off saw across the log as shown in FIGS. 3 and 6. With the aid of the encoder information the log is then consecutively moved forward and stopped by the rolls 18, 20, 21 at the desired locations according to the scanner information to cut the log at the optimum lengths. The feed rolls are able in this way to move the log rapidly between successive cutting positions. The system can also be manually overridden by an operator and defects, which are picked up by the operator, can be manually bucked out of the logs.

The throughput speed of the sawing or bucking step is increased by the sensing of the log diameters during the sawing process. The hydraulic cylinders 40, 42 which control the arms 22, 23 which pivot the vertical feed rolls 20, 21 are equipped with TEMPOSONIC ™ linear positioners which sense the length of the stroke on the hydraulic cylinders which control the arms 22, 23 and thereby generate a signal indicative of the diameter of the log, which is also used for pre-positioning of the vertical feed rolls 20, 21 as the log moves forward. This information is compared to the scanning information to confirm that the log is being scanned at the proper location The log diameter information is also used to pre-position the cut-off saw 26 as well as control the stroke of the saw when the log is bucked. For example, as the diameter of the log changes, the rest position of the cut-off saw will be moved towards or away from the log to reduce the distance the cut-off saw must swing to saw the log. The length of the stroke or swing of the cut-off saw is also determined by the measured diameter of the log so that the cut-off saw can complete its stroke and return to its start position in the minimum time, thereby maximizing throughput.

Figure 4:
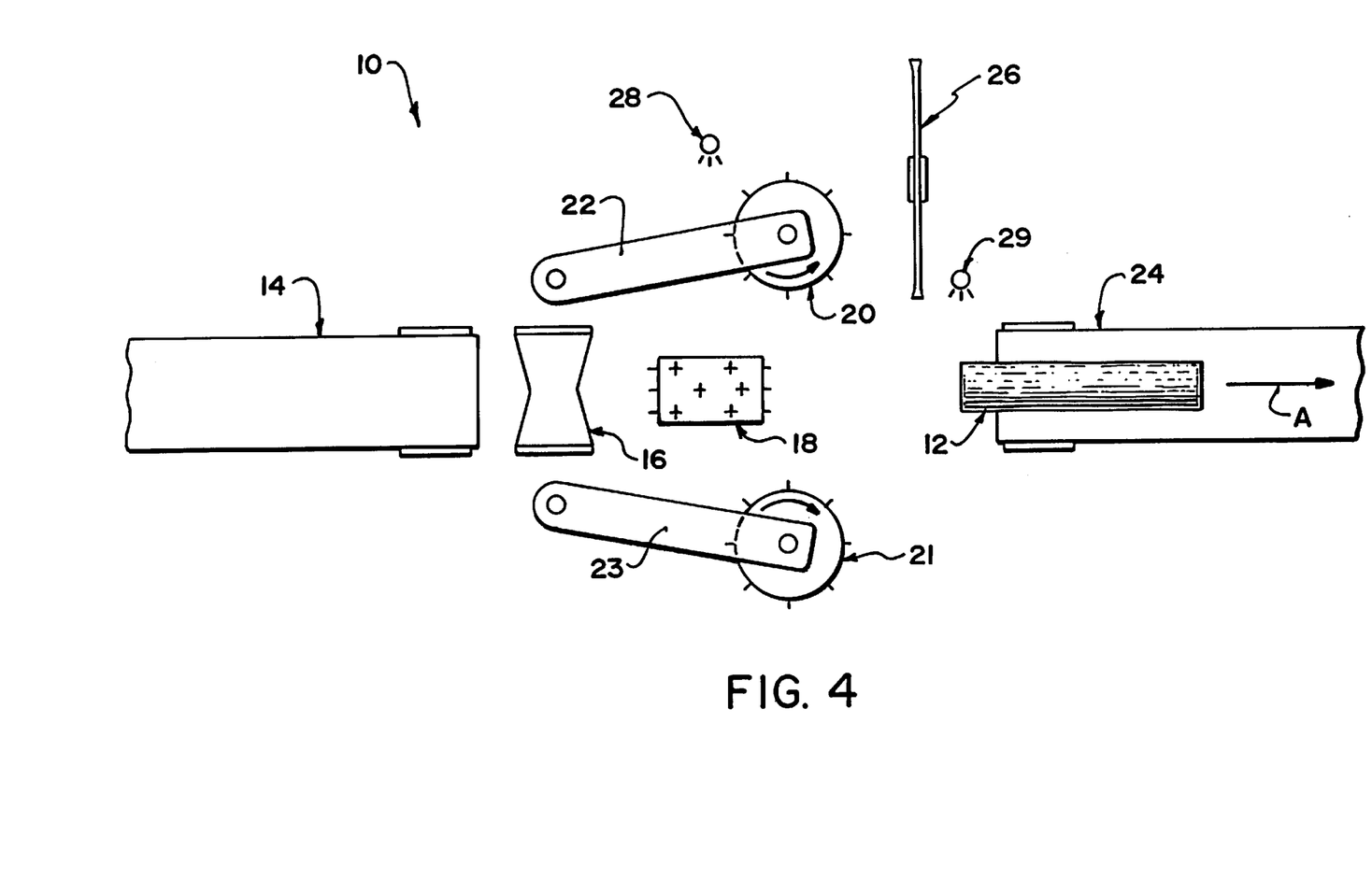
FIG. 4 is a schematic diagram showing the apparatus of the invention in top view with the sawn segment of the log on the outfeed conveyor.

Predetermined desired lengths for the log segments to be cut from a tree-length log can be pre-programmed into the system so that as the next programmed length is approached the hydraulics automatically start to slow the log down and stop at the desired length. The cut-off saw is then automatically activated and cycled to cut the log. Once the first segment is bucked from the log, the feed rolls advance the log at very high speeds to the next programmed length for bucking. Meanwhile the segment of the log which has been bucked can be advanced at high speed on the outfeed conveyor 24 to the next processing stage (see FIG. 4).

Existing lineal bucking systems do not have any method for quickly rejecting or disposing of short log ends or other debris in the system. At present this material must be sawn into very short lengths by the bucking saw so that it can drop onto refuse conveyors under the cut-off saw. In the present invention, the horizontal feed roll is mounted on pivot shaft 46 (FIG. 6) whereby hydraulic cylinder 48 holds feed roll 18 up in the normal operating position. If a short chunk or other piece of reject material develops at the cut-off saw, the bottom horizontal feed roll 18 can be depressed and the material deposited directly into a refuse conveyor. This eliminates the need to cut the debris into shorter pieces to remove it, thereby increasing the overall throughput.

Since the infeed conveyor continues to feed during the intervals when rolls 18, 20, 21 are stopped to buck the log, gaps between the logs are reduced and the throughput is increased. The higher throughput speed during sawing is also achieved through the use of the hydraulic motors and encoders on the feed rolls.

Figure 10:
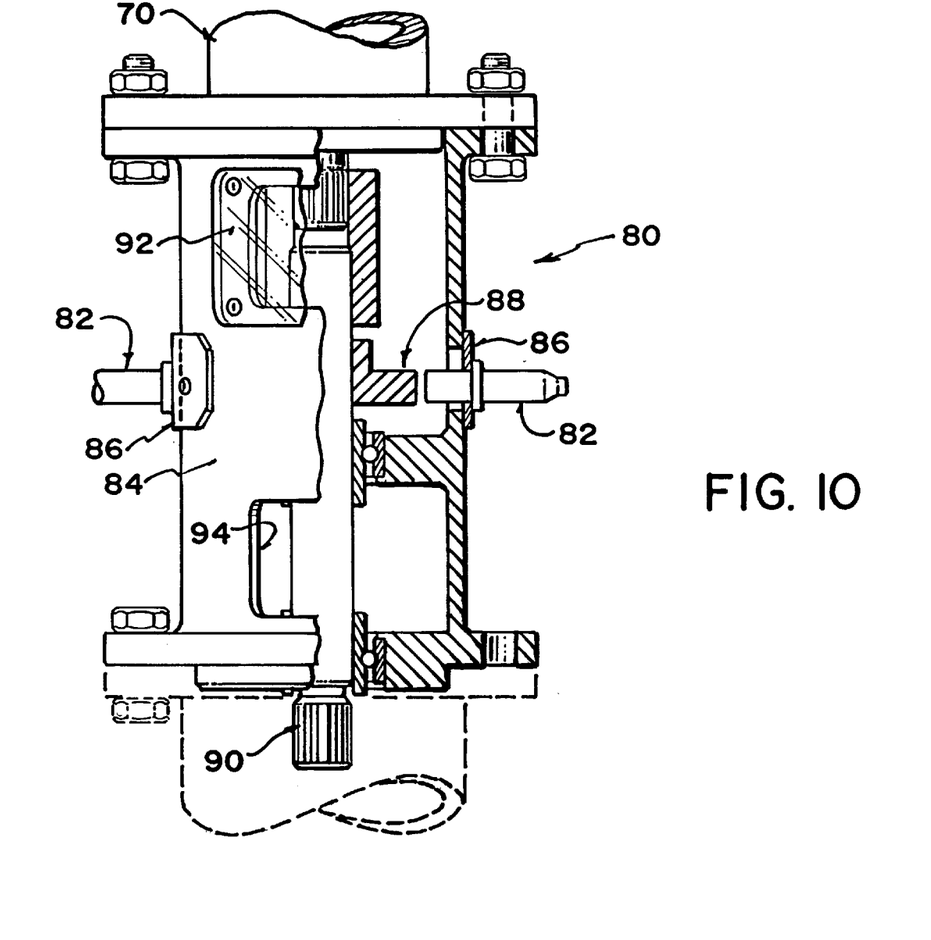
FIG. 10 is an elevation view, partly in section, of the encoders of the invention.
Figure 11:
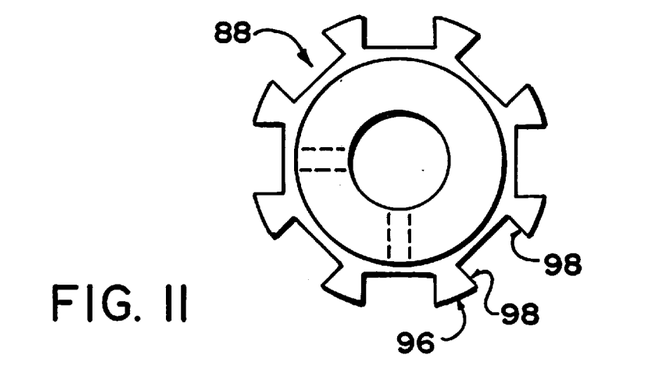
FIG. 11 is a plan view of the encoding disc used in the encoders of the invention.

The encoding of the hydraulic motors for the vertical feed rolls is achieved by providing encoders 80 as shown in FIG. 10. Two inductive proximity sensors 82, which are preferably OMRON, Model TL-X2B1-GL are mounted on encoder housing 84 by adjustable mounting plates 86. They pick up the reflected light from the encoder discs 88 coupled to the output shafts of the hydraulic motors 70. The pulses are converted by the central processing unit into a corresponding distance of travel of the log 12. A splined shaft 90 couples the motor output to a planetary gearbox. Windows 92, 94 permit viewing of the interior of the housing. The encoding disc 88, shown in FIG. 11, has a number of lobes 96 which interact with the proximity sensors, the sides 98 of which are cut away to provide a more accurate reading.

The preferred form of the invention uses tandem pneumatic/hydraulic cylinders 40, 42 REXROTH™ MXO-PP/ME6-HH with a TEMPOSONIC II™ probe system to move the arms 22, 23. Since the tree-length logs coming into the feed system may be either top or butt first, the feed rolls must move with the taper of the log as it advances through the system. As the rolls move with the taper, they must still maintain constant pressure on the log, preventing the rolls from slipping and producing inaccurate log lengths. The hydraulic circuit is designed such that a constant pressure is maintained on the log at all times. However irregularities in the log such as knots or burls will also be encountered by the feed rolls moving at considerable speed, which will tend to cause the rolls to lose contact with the surface of the log. To reduce this effect the hydraulic cylinders are provided with associated pneumatic cylinders. The pneumatic cylinders (FIGS. 6 and 7), operating at low air pressures, are mounted in tandem with the hydraulic cylinders 40, 42 to absorb and dampen any sudden lateral movement to maintain contact of the feed rolls on the log.

Another aspect of the control system for the hydraulic cylinders is a feature to maintain accurate log positioning at high speed throughput. As the speed of the log increases, considerable momentum or inertia is built up, so that when the system tries to stop the log at the desired position, there is a tendency for the log to overshoot. This tendency is overcome by decreasing the hydraulic pump pressure in the hydraulic line serving motors 70 as the log is slowed so that the hydraulic system provides a braking action to help slow the log as it approaches the selected position.

Figure 5:
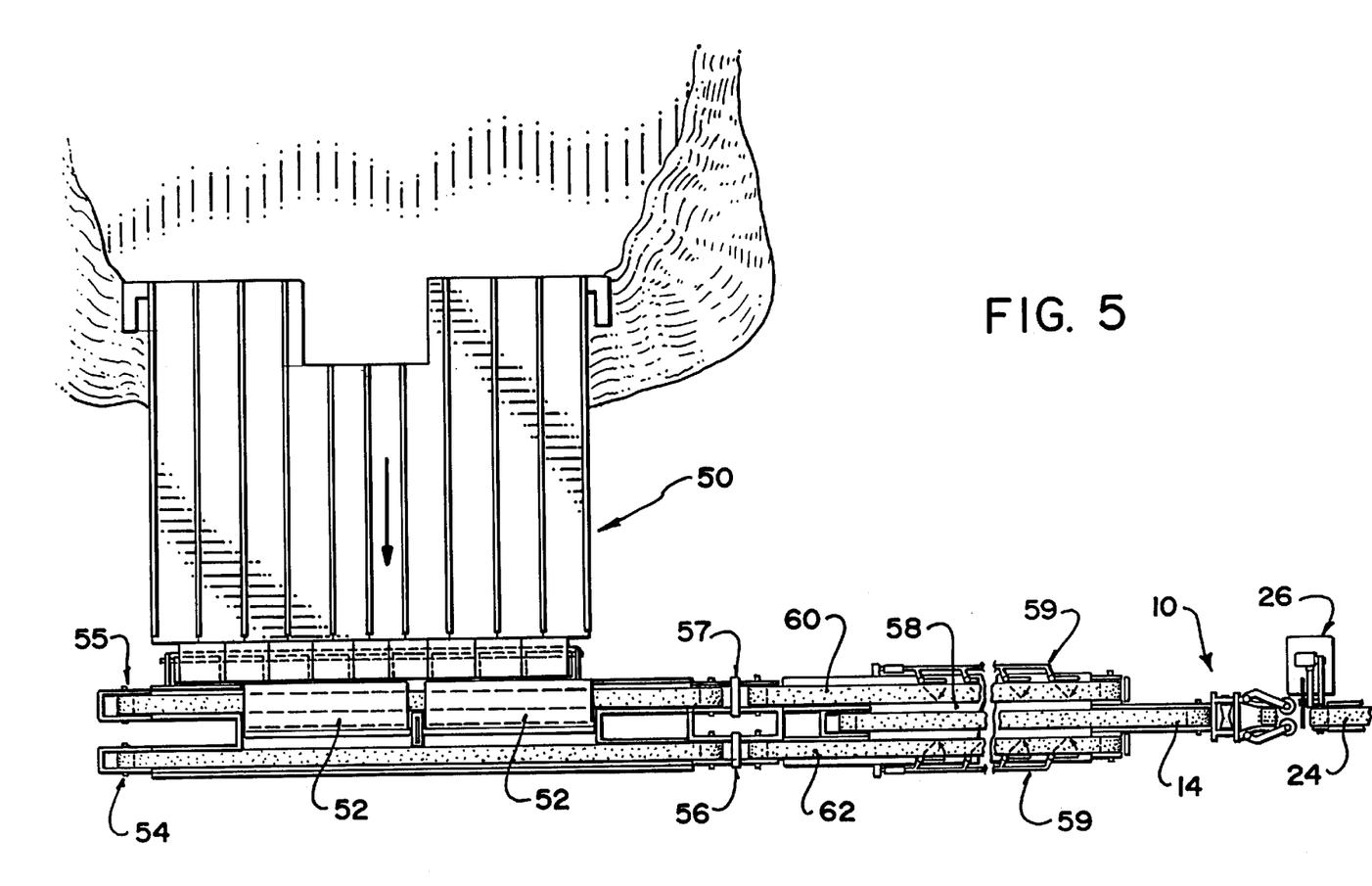
FIG. 5 is a plan view of the feeding and bucking according to the invention.

Conventional scanning arrangements are unsuitable for the present invention which not only reduces gaps between logs in the system but also increases the throughput speed through the cut-off saw. In conventional systems, logs are transported transversely on a log deck to a point where they are singulated into a conveyor that moves the logs longitudinally through a log scanner and from there to the cut-off saw. Each log is transported separately through the scanner with a gap of two to four feet between consecutive logs. This conventional arrangement cannot provide an adequate supply for the high throughput of the present invention. Consequently, a modified scanning arrangement is preferred for the present invention as illustrated in FIG. 5. Logs are transported transversely on log deck 50 to a diverter gate 52 where they are diverted onto one of two parallel conveyors 54, 55 which transport the logs longitudinally through two parallel log scanners 56, 57 and from there by parallel conveyors 60, 62 to a deck 58 where two log sweeps 59 alternately sweep the logs onto infeed conveyor 18 and from there to the cut-off saw 26. This arrangement reduces gaps between logs as they enter the present bucking system.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Apparatus for sawing a log into segments of a predetermined length comprising:
   a) a first log-feeding means for feeding a log in an end-wise line of travel;
   b) first and second vertically oriented log-feeding means for engaging and advancing a log, said first vertically oriented log-feeding means mounted for pivotal movement from a first non-log-engaging position to a second log-engaging position;
   c) power means for pivoting said first vertically oriented log-feeding means from said first non-log-engaging position to said second log-engaging position and back to said first non-log-engaging position;
   d) a saw movable across the line of travel of said log downstream from said vertical log-feeding means;
   e) means for measuring the distance said log is advanced while engaged by said vertical log-feeding means and communicating said measurement to a control means;
   f) power means for moving said saw in response to a control signal from said control means;
   g) a second horizontally oriented log-feeding output means adapted to receive said log downstream from said saw; and
   h) control means for receiving said measurement signal and communicating control signals to said power means for moving said saw and controlling said first and second vertically oriented log-feeding means;
   wherein said first and second vertically oriented log-feeding means are adapted to advance and stop said log in response to said control signal.

2. The apparatus of claim 1 wherein said means for measuring the distance said log is advanced comprise hydraulic motors for driving said first and second vertically oriented log-feeding means, having sensors for measuring the number of rotations of said motors.

3. The apparatus of claim 1 wherein said means for measuring the distance said log is advanced comprise first sensing means for sensing the approach of said log to said first and second vertically oriented log-feeding means and causing said power means to pivoting said first log-feeding means into said log-engaging position, means for measuring the distance travelled by said log while engaged by said first and second vertically oriented log-feeding means, and second sensing means for sensing when the front end of said log reaches a position after said first and second vertically oriented log-feeding means.

4. The apparatus of claim 1 further comprising means for scanning said log prior to said log being received on said second horizontal log feeding means.

5. The apparatus of claim 1 wherein said first and second vertically oriented log-feeding means comprise vertical feed rolls, said first vertically oriented log-feeding means being pivoted by said power means.

6. The apparatus of claim 1 wherein said first and second vertically oriented log-feeding means comprise vertical feed rolls pivotally mounted on the ends of arms, said first vertically oriented log-feeding means being pivoted by said power means.

7. The apparatus of claim 1 further comprising sensing means associated with said power means for pivoting said first vertically oriented log-feeding means for generating a signal indicative of the diameter of the log and communicating said signal to said control means.

8. Apparatus for controllably feeding a log in a generally horizontal end-wise line of travel during processing thereof, comprising:
   a) first and second vertically oriented log-feeding means, said first vertically oriented log-feeding means mounted for pivotal movement from a first non-log-engaging position to a second log-engaging position, and said first and second vertically oriented log-feeding means each comprising a power-driven rotating log-advancing cylinder rotatable about a generally vertical axis and comprising a log-engaging outer surface;
   b) first power means for controllably rotating or stopping one of said log-advancing cylinders;
   c) second power means for pivoting said first vertically oriented log-feeding means from said first non-log-engaging position to said second log-engaging position and back to said first non-log-engaging position;
   d) means for measuring the distance said log is advanced and communicating said measurement to a control means;
   e) control means for receiving said measurement signal and communicating control signals to said power means for moving said saw and controlling said first and second vertically oriented log-feeding means;
   wherein said first and second vertically oriented log-feeding means are adapted to advance and stop said log in response to said control signal.

9. The apparatus of claim 8 wherein said means for measuring the distance advanced by said log comprises a hydraulic motor having a sensor for measuring the number of rotations of said motor.

10. The apparatus of claim 8 wherein said first and second vertically oriented log-feeding means comprise vertical feed rolls, said first vertically oriented log-feeding means being pivoted by said power means.

11. The apparatus of claim 10 wherein said first and second vertically oriented log-feeding means comprise vertical feed rolls pivotally mounted on the ends of arms, said first vertically oriented log-feeding means being pivoted by said power means.

12. The apparatus of claim 8 further comprising sensing means associated with said second power means for pivoting said first vertically oriented log-feeding means for generating a signal indicative of the diameter of the log and communicating said signal to said control means.

\* \* \* \* \*